March 26, 1957 E. J. STEWART Re. 24,296

APPARATUS FOR INFRA-RED COOKING

Original Filed Oct. 26, 1954 2 Sheets-Sheet 1

Inventor
Edward J. Stewart

APPARATUS FOR INFRA-RED COOKING

Original Filed Oct. 26, 1954 2 Sheets-Sheet 2

Inventor.
Edward J. Stewart

United States Patent Office

Re. 24,296
Reissued Mar. 26, 1957

24,296

APPARATUS FOR INFRA-RED COOKING

Edward J. Stewart, Harvard, Ill., assignor to Stewart In-fra-red, Inc., Harvard, Ill., a corporation of Illinois Original No. 2,764,664, dated September 25, 1956, Serial No. 464,805, October 26, 1954. Application for reissue October 10, 1956, Serial No. 615,216

4 Claims. (Cl. 219—35)

Matter enclosed in heavy brackets [ ] appears in the original patent but forms no part of this reissue specification; matter printed in italics indicates the additions made by reissue.

This invention relates to that class of devices commonly known as "cookeries" or "cookers" wherein facilities are provided for heating foodstuffs by infra-red radiation.

Such devices have ben previously known in the prior art and have been used more or less extensively in applications calling for rapid heating of food, particularly in such applications as the heating of pre-packaged sandwiches, frankfurters, and other food items of the sort customarily sold at concession stands and sandwich shops.

Prior-art devices of this class, however, have had definite limitations which have seriously restricted their field of utility. For one thing, they have been dangerous to personnel since the infra-red sources and the metal reflectors associated with them have in general been positioned where there was serious danger of contact with them during the operation of inserting or removing food.

Furthermore, the efficiency of the prior-art devices has been substantially less than it should be, since, in order to reduce as much as possible the danger of contact with the infra-red sources, designers of such existing devices have placed the sources of heat radiation further from the food to be cooked than they should be. This construction has led to excessive dependence on expensive reflectors for focusing the heat in the cooking zones and has required use of excessively large cabinets.

The main object of the present invention is to provide an infra-red cooking apparatus wherein the infra-red sources can be placed at optimum distance from the cooking zone to achieve maximum heat utilization and most efficient cooking, while at the same time eliminating entirely danger of direct contact with the radiation sources or other dangerously hot surfaces by the persons using the apparatus.

In achieving this primary object, I have also achieved the secondary objects of providing an infra-red cooking apparatus that is substantially more compact than was possible with previous designs and which is not dependent on expensive, specially designed reflecting surfaces for successful operation.

Figure 1:
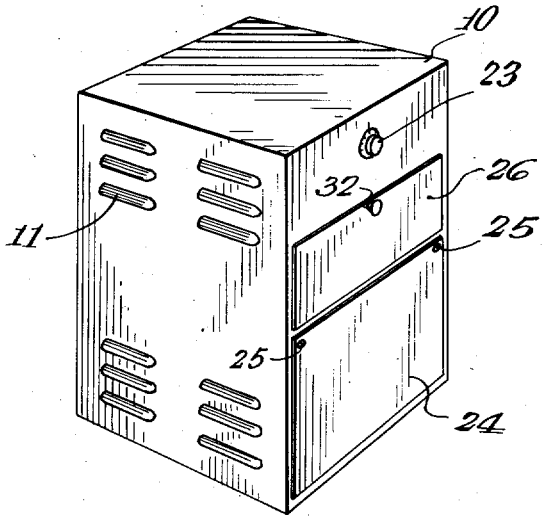
Figure 2:
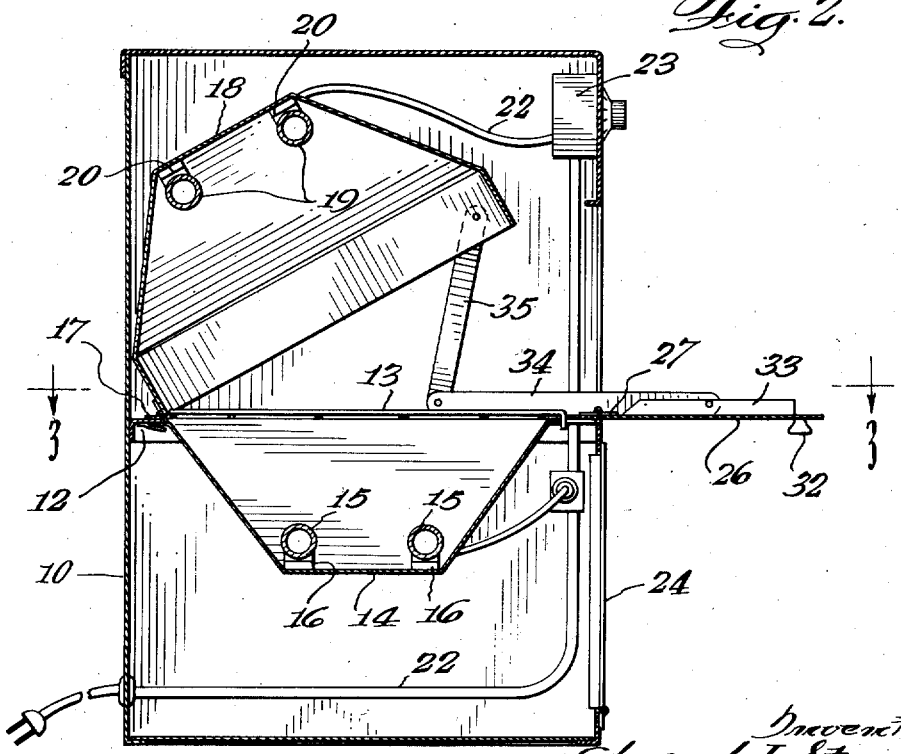
Figure 3:
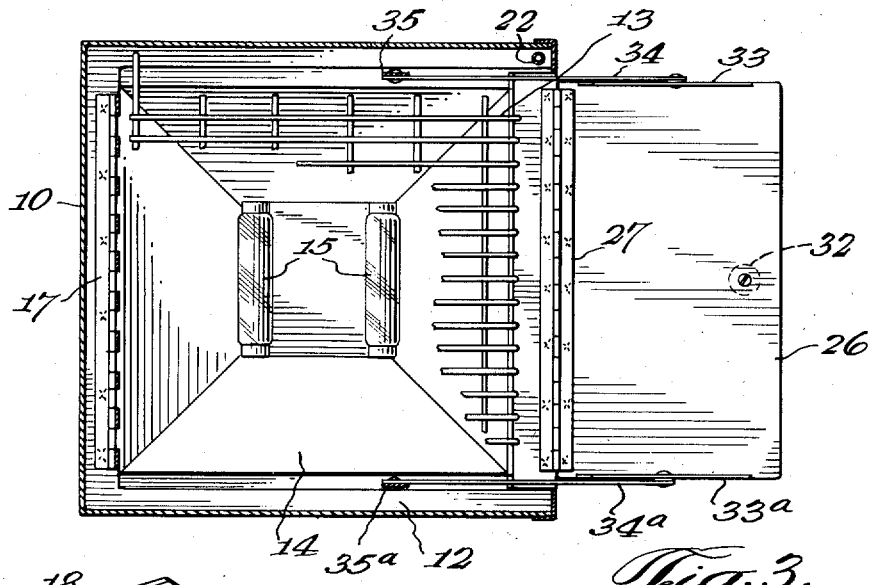
Figure 4:
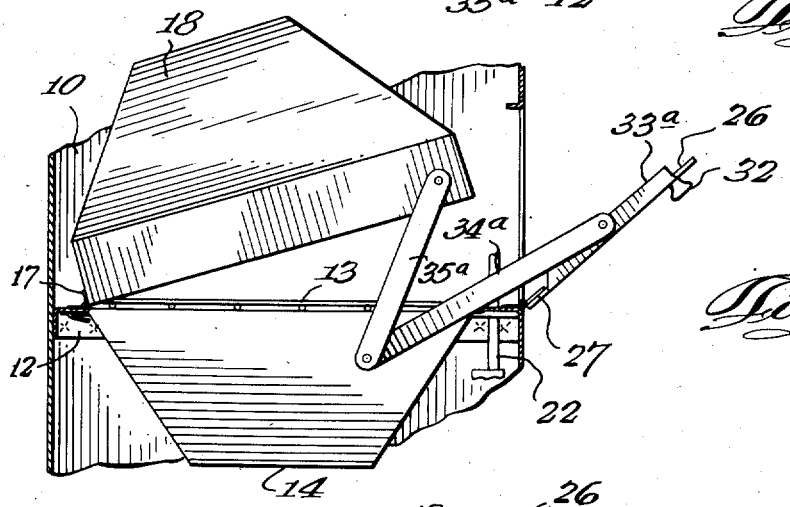
Figure 5:
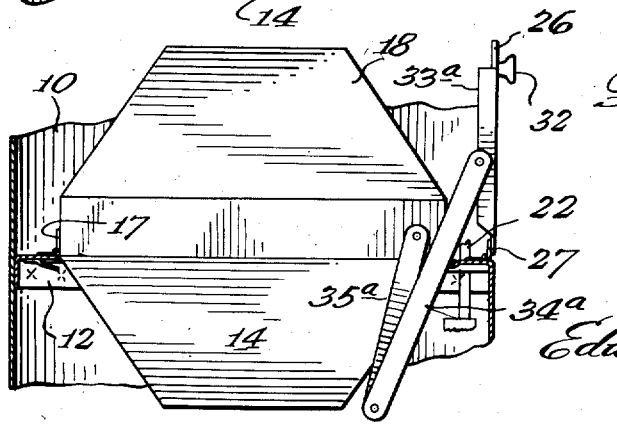

I have illustrated a typical embodiment of my invention in the accompanying drawing, in which Figure 1 is an exterior perspective view of an apparatus for infra-red cooking in accordance with my invention; Fig. 2 is a view of the Fig. 1 apparatus in vertical section, showing the parts in the position they occupy when the access door is fully opened; Fig. 3 is a sectional view in the horizontal plane, taken along the line 3—3 of Fig. 2; Fig. 4 is a fragmentary side view of the moving parts of the apparatus, the side of the cabinet being cut away and the access door being partially opened; and Fig. 5 is a view similar to Fig. 4 but showing the parts in the position they occupy when the access door is closed.

As may be seen from Fig. 1, the illustrated embodiment of my invention is housed in a suitable rectangular cabinet 10, preferably made of sheet metal. Ventilating louvers 11 may be provided in the cabinet sides to permit easy circulation of air through the interior of the cabinet to prevent overheating.

Referring now to Figs. 2–5, I have provided within the cabinet a ledge or bracket 12 extending inwardly of the inside wall of the cabinet and extending entirely around the cabinet at a level approximately half way between the top and bottom thereof. Bracket or ledge 12 serves as support for a grill 13, which occupies the cooking zone and which has the function of supporting food for cooking.

Suitably supported by the ledge 12 and occupying a position in the cabinet generally below the ledge 12 is a polygonally shaped member 14, preferably formed of sheet metal and being provided on its inner surface with a high polish operative effectively to reflect infra-red radiation. Element 14 serves as a support for a portion of the infra-red sources which provide heat for cooking. These sources, which may be bought commercialy, are suitable sources of infra-red radiation; I have illustrated, as the preferable type of such sources, the tubular quartz infra-red bulbs now available on the market. In the illustrated embodiment, I have shown two of such quartz tubes 15 mounted in suitable sockets 16 on the inner bottom surface of the reflector element 14.

The exact proportions and shape of the reflector element 14 will depend in considerable measure on the characteristics of the infra-red sources 15 and the number of such sources mounted in the reflector element. The important point, for present purposes, is that the reflector element 14 should be so designed and proportioned as to place the infra-red sources 15 at the optimum distance from the grill 13 to achieve, in combination with the reflector 14, optimum concentration of cooking heat over the surface of the grill 13.

Carried on the rear portion of the ledge 12, and mounted thereto by means of a piano hinge 17, is an upper reflector element 18 essentially similar in structure and shape to the lower element 14. Upper reflector element 18, however, is not fixed in position relative to the cabinet but is rockable on hinge 17.

A suitable number of infra-red sources 19, which may be similar to sources 15, is mounted in sockets 20 on the inner top surface of the upper reflector element 18, preferably in a position symmetrical with respect to the position of sources 15 in the lower reflector element 14.

The foregoing remarks with respect to the shaping, proportioning, and dimensions of reflector 14 apply also to reflector element 18, it being preferred that the elements 18 and 14 form, when in the position shown in Fig. 5, a symmetrical structure. As in the design of the element 14, element 18 should be designed so as to place the infra-red sources 19 at the optimum distance above grill 13 for maximum concentration of cooking heat in the zone immediately above the grill 13.

Suitable electrical connections 22, including a manually controllable current regulator 23, may be provided for supplying appropriate electric current to the infra-red sources 15 and 19. Such electrical connections are conventional and are not part of the present invention; hence they have not been shown in detail.

The front of the cabinet 10 may be provided with a lower hinged door 24, suitably secured in a closed position by means of captive screws 25 or other suitable closure device. The function of door 25 is to provide a convenient means of getting at the interior of the cabinet for purposes of cleaning and repair. Door 24 is not normally opened during routine use of the apparatus, and closure members 25 may accordingly be arranged so as to be releasable only by means of a servicing tool, such as a screw driver.

Above door 24, and disposed so that its bottom edge is substantially at the same height as grill 13, I provide a main access door 26, hinged to the front portion of ledge 12 by means of piano hinge 27. As may be seen from Figs. 2 and 3, the grill 13 is exposed to access from the outside when the door 26 is fully opened. At the same time, opening of door 26 causes the upper reflector element 18 to be rocked upwardly and backwardly on hinge 17, so as to separate the two reflector elements 18 and 14, clam-shell fashion, leaving the grill 13 available for convenient deposition or removal of food products while at the same time removing the infra-red sources 19 completely out of range of contact with the hands of the operator of the apparatus.

The action just mentioned is accomplished by means of two pairs of symmetrically disposed levers 34, 35, 34a, and 35a. The levers 34 are pivoted respectively to flanges 33 and 33a, formed at the outer edges of the door 26. At their inner ends the levers 34 and 34a are pivoted respectively to the levers 35 and 35a, the upper ends of which are respectively pivoted to the sides of upper reflector member 18, as is shown most clearly in Figs. 2, 4, and 5.

When the door 26 is pulled open by the operator, the levers 34 and 34a bear against the inner edge of flange 12, as shown in Figs. 4 and 5, and rotate around that point as a fulcrum, in such action forcing the levers 35 and 35a to rise and hence forcing the upper reflector element 18 to rock backward on the piano hinge 17. When the door 26 reaches a horizontal position, as shown in Fig. 2, the levers 34 and 35 reach a stable position, resting on the upper surface of door 26 and the upper surface of ledge 12, and the reflector member 18 is thus held in raised position while the operator places food on or removes food from the grill 13. When that operation has been completed, the operator may then lift door 26 to its closed position, as shown in Fig. 5, and the upper reflector element 18 will then return to its normal symmetrical position above lower reflector element 14, as shown in Fig. 5. It will of course be understood that the electrical cord 22 running to the upper reflector element 18 will be made of sufficient length to leave the reflector 18 free to move as aforesaid.

To permit convenient opening and closing of the door 26, I provide a suitable handle 32.

While I have in the present specification described in considerable detail a typical embodiment of my invention, it is to be understood that that description is exemplary only, and that many changes and variations in the structure shown may be made by persons skilled in the art without departing from the spirit of my invention.

I claim:

1. An apparatus for cooking by infra-red radiation comprising a cabinet, a radiation-source supporting means, said supporting means being provided with reflector means, means for mounting said supporting means at an intermediate height within said cabinet, a source of infra-red radiation carried by said supporting means above said reflecting means, whereby radiation from said source may be reflected upwardly from said reflecting means, a second radiation-source supporting means, said means comprising also second reflector means, means movably mounting said second supporting means within said cabinet operative to afford to said second supporting means a limited range of movement between one position whereat said first and second supporting means are in closely facing relationship and a second position whereat said second supporting means is retracted from said first supporting means, an infra-red source mounted on said second supporting means and disposed below said second reflecting means whereby radiation from said second source may be reflected downwardly from said second reflector means, food-supporting means disposed within said cabinet between said first and second supporting means, an access door in said cabinet, and coordinating means linking said access door and said second supporting means operative when said door is opened to move said second supporting means from its closely facing position to its retracted position, said coordinating means comprising a first link and a second link, one end of the first link being pivoted to one end of the second link, the other end of the first link being pivoted to said access door, and the other end of said second link being pivoted to said second supporting means, the cabinet being provided with abutting means adjacent said access door operative when said door is opened to act as a fulcrum around which said first link rotates in one direction during the opening movement of said door and in the opposite direction during closing movement of said door.

2. An apparatus for cooking by infra-red radiation comprising a cabinet, a first radiation-source supporting means, said supporting means being provided with reflector means, means for mounting said supporting means at an intermediate height within said cabinet, a source of infra-red radiation carried by said supporting means above said reflecting means, whereby radiation from said source may be reflected upwardly from said reflecting means, a second radiation-source supporting means, said means comprising also second reflector means, hinge means movably mounting said second supporting means within said cabinet operative to afford to said second supporting means a limited range of rotational movement, clam-shell fashion, between a closed position whereat said first and second support means are in closely facing relationship and an open position whereat said second supporting means is retracted angularly from said first supporting means, an infra-red source mounted on said second supporting means and disposed below said second reflecting means whereby radiation from said second source may be reflected downwardly from said second reflector means, food-supporting means disposed within said cabinet and positioned between said first and second supporting means whereby it occupies a space substantially midway between said first and second infra-red sources when said first and second supporting means are in closely facing relationship, an access door in said cabinet, said access door being disposed in a side of said cabinet opposite said hinge means, said access door having an open position and a closed position, a first link and a second link, one end of the first link being pivoted to one end of the second link, the other end of the first link being pivoted to the access door and the other end of said second link being pivoted to said second supporting means, said cabinet being provided with abutting means adjacent said access door operative when said door is opened to engage said first link and to act as a fulcrum around which said first link rotates in one direction during the opening movement of said door and in the opposite direction during closing movement of said door, whereby said second supporting means is moved from its closed position to its retracted position when said door is opened.

*3. An apparatus for cooking by infra-red radiation comprising a cabinet, a radiation-source supporting means, said supporting means being provided with reflector means, means for mounting said supporting means at an intermediate height within said cabinet, a source of infra-red radiation carried by said supporting means above said reflecting means, whereby radiation from said source may be reflected upwardly from said reflecting means, a second radiation-source supporting means, said means comprising also second reflector means, means movably mounting said second supporting means within said cabinet operative to afford to said second supporting means a limited range of movement between one position whereat said first and second supporting means are in closely facing relationship and a second position whereat said second supporting means is retracted from said first supporting means, an infra-red source mounted on said second supporting means and disposed below said*

*second reflecting means whereby radiation from said second source may be reflected downwardly from said second reflector means, food-supporting means disposed within said cabinet between said first and second supporting means, an access door in said cabinet, and coordinating means linking said access door and said second supporting means operative when said door is opened to move said second supporting means from its closely facing position to its retracted position, said coordinating means comprising a first member having one end portion connected to said access door, a second member having one end pivoted to the other end portion of said first member, the other end of said second member being pivoted to said second supporting means, said first member extending rearwardly and downwardly from said door, said second member extending upwardly between said first member and said second supporting means, and means for swinging said first member about a predetermined axis in one direction in response to opening movement of said door and in the opposite direction in response to closing movement of said door.*

*4. An apparatus for cooking by infra-red radiation comprising a cabinet, a first radiation-source supporting means, said supporting means being provided with reflector means, means for mounting said supporting means at an intermediate height within said cabinet, a source of infra-red radiation carried by said supporting means above said reflecting means, whereby radiation from said source may be reflected upwardly from said reflecting means, a second radiation-source supporting means, said means comprising also second reflector means, hinge means movably mounting said second supporting means within said cabinet operative to afford to said second supporting means a limited range of rotational movement, clam-shell fashion, between a closed position whereat said first and second support means are in closely facing relationship and an open position whereat said second*

*supporting means is retracted angularly from said first supporting means, an infra-red source mounted on said second supporting means and disposed below said second reflecting means whereby radiation from said second source may be reflected downwardly from said second reflector means, food-supporting means disposed within said cabinet and positioned between said first and second supporting means whereby it occupies a space substantially midway between said first and second infra-red sources when said first and second supporting means are in closely facing relationship, an access door in said cabinet, said access door being disposed in a side of said cabinet opposite said hinge means, said access door having an open position and a closed position, a link having one end pivoted to said second supporting means, a swingable member pivoted to the other end of said link and connected between said link and said access door, said swingable member extending rearwardly and downwardly from said door, said link extending upwardly between said swingable member and said second supporting means, and means for swinging said member about a predetermined axis in one direction in response to the opening movement of said door and in the opposite direction in response to closing movement of said door, whereby said second supporting means is moved from its closed position to its retracted position when said door is opened.*

References Cited in the file of this patent or the original patent

UNITED STATES PATENTS

| | | |
|---|---|---|
| 1,759,832 | Banff | May 27, 1930 |
| 2,040,598 | Cronyn | May 12, 1936 |

FOREIGN PATENTS

| | | |
|---|---|---|
| 470,791 | Canada | June 16, 1951 |